Patented Dec. 22, 1936

2,065,389

UNITED STATES PATENT OFFICE 2,065,389

CEMENT FOR METALLIC AND CERAMIC CONSTRUCTIONAL PARTS

Artur Möhrle, Stuttgart, Germany, assignor to Robert Bosch Aktiengesellschaft, Stuttgart, Germany No Drawing. Application May 22, 1935, Serial No. 22,883. In Germany June 20, 1934

6 Claims. (Cl. 106—30)

The present invention relates to cements for joining constructional parts made from metallic and ceramic materials.

The manufacture of many products or devices composed of many separate parts is often much simplified, if instead of a mechanical fastening together of the separate constructional parts, a sufficiently firm and also otherwise suitable connection can be effected by cementing.

The object of the invention is a cement for joining constructional parts of metallic and ceramic materials, which possesses the most varied possibilities of use in connection with the group of materials stated. This cement is equally suitable for joining metal to metal, and metal to ceramic material, as well as for the joining of ceramic material to ceramic material. It consists of a mixture made with concentrated water-glass solution of finely ground alumina, preferably corundum powder, and silicofluorides, preferably magnesium silicofluoride.

It has been found by experience that one and the same cement is generally useful only for one quite definite purpose. Thus, for instance, the cements known and used as acid cements, and made from flint powder and water-glass, shrink too strongly and have too slight an adhesiveness to be able to be used as a cement for metallic constructional parts. Bakelite also adheres badly to metals. Asphalt cements, which adhere well, soften at temperatures but little above room-temperature. The cementing capacity of the last-mentioned cements is substantially reduced by a film of oil on the metal parts to be joined. If they are glazed, ceramic constructional parts cannot be cemented to bakelite, and if the finished product when in use is to be subject to stress due to heat it cannot be cemented with asphalt.

The cement according to the invention signifies a great advance over the known cements. The advantages of the cement according to the invention are:—Greater scope of application, great mechanical strength and hardness, exceptional adhesiveness, limited shrinkage, independence of the nature of the surface of the parts to be joined (rough or smooth metal surface, oil film, porous or glazed bodies), resistance to high temperatures, durability, and resistance to acids. These advantages are of great importance, both separately and collectively.

In the preparation of the cement according to the invention finely ground alumina, preferably corundum powder, is mixed with silicofluorides, preferably magnesium silicofluoride, namely 95–99.8% by weight of corundum powder, and 0.2–5% by weight of silicofluoride. The powdery mixture of corundum powder and silicofluoride is then mixed to a cement with concentrated water-glass solution. The consistency of the cement is naturally dependent on the concentration and on the quantity of the water-glass solution added.

Experiments have now had the surprising result, that the concentration of the water-glass solution can be decisive for the quality of the cement for certain purposes within the scope of application stated.

It is therefore advisable to choose such a concentration of the water-glass solution to be added that will produce the quality of cement best suited for the particular purpose of use. In this way one has at disposal one of the two factors which determine the consistency of the cement, the concentration of the water-glass solution. By varying the quantity of the water-glass solution added, the consistency of the cement can then be regulated according to requirements.

Thus, for example, when it is a question of the cementing of the central electrode of a sparking plug in the insulator, a water-glass solution of less than 35° Baumé, preferably 30° Baumé, it is to be used, whilst for most purposes, where the finished product has to withstand no great temperatures, a water-glass solution of more than 35° Baumé, preferably 40° Baumé, is suitable for the purpose.

The cement according to the invention has the most varied possibilities of use, and no application within the scope referred to is excluded. The new cement is specially advantageous for the cementing of the central electrode of a sparking plug into the insulator in cases where the sparking plug insulator has a great thermal expansion.

I declare that what I claim is:

1. A cement for joining ceramic and metallic materials consisting of a mixture with concentrated water-glass solution of 95 to 99.8% of finely divided alumina and 0.2 to 5% of a silicofluoride.

2. A cement for joining ceramic and metallic materials consisting of a mixture with concentrated water-glass solution of 95–99.8% of finely divided alumina and 0.2 to 5% of magnesium silicofluoride.

3. A cement for joining ceramic and metallic materials consisting of a mixture with concentrated water-glass solution of 95–99.8% of corundum powder, and 0.2–5% of magnesium silicofluoride.

4. A cement as claimed in claim 1 in which the concentration of the water-glass solution is varied so as to obtain the quality of cement best suited for the purpose of use.

5. A cement for joining the central electrode of a sparking plug to the insulator consisting of a solution of water-glass of less than 35° Baumé mixed with finely divided alumina and a silicofluoride.

6. A cement for joining the central electrode of a sparking plug to the insulator consisting of a solution of water-glass of 30° Baumé mixed with 95–99.8% of corundum powder and 0.2–5% of magnesium silicofluoride.

ARTUR MÖHRLE.